(12) United States Patent
Cho et al.

(10) Patent No.: US 6,813,227 B2
(45) Date of Patent: Nov. 2, 2004

(54) APPARATUS AND METHOD TO COMPENSATE FOR DISTURBANCE USING LEARNING CONTROL IN AN OPTICAL RECORDING/REPRODUCING APPARATUS AND OPTICAL RECORDING MEDIUM DRIVE SERVO SYSTEM

(75) Inventors: Seong-il Cho, Seoul (KR); Joong-eon Seo, Gyeonggi-do (KR); Jin-hoon Jeon, Gyeonggi-do (KR); Soo-yul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 09/938,304

(22) Filed: Aug. 24, 2001

(65) Prior Publication Data

US 2002/0024899 A1 Feb. 28, 2002

(30) Foreign Application Priority Data

Aug. 26, 2000 (KR) ......................................... 2000-49866

(51) Int. Cl.$^7$ ................................................. G11B 7/00
(52) U.S. Cl. ................................ 369/44.28; 369/44.34; 360/77.04; 360/78.09
(58) Field of Search .......................... 369/44.28, 44.32, 369/44.34, 44.35, 53.14, 53.18, 77.02, 77.04; 360/77.08, 77.11, 78.04, 78.09

(56) References Cited

U.S. PATENT DOCUMENTS

| | | | |
|---|---|---|---|
| 5,402,400 A | * | 3/1995 | Hamada et al. .......... 360/78.06 |
| 5,949,605 A | | 9/1999 | Lee et al. |
| 5,952,804 A | | 9/1999 | Hamamura et al. |
| 5,959,952 A | * | 9/1999 | Wakuda .................. 369/44.32 |
| 6,141,175 A | | 10/2000 | Nazarian et al. |
| 6,166,875 A | * | 12/2000 | Ueno et al. .............. 360/77.04 |
| 6,236,536 B1 | | 5/2001 | Ma et al. |
| 6,628,579 B2 | * | 9/2003 | Watanabe et al. ........ 369/44.28 |
| 6,650,499 B1 | * | 11/2003 | Kusumoto ............... 360/77.04 |
| 6,661,599 B1 | * | 12/2003 | Chen et al. .............. 360/77.04 |
| 6,721,247 B2 | * | 4/2004 | Watanabe ................ 369/44.34 |

FOREIGN PATENT DOCUMENTS

| | | |
|---|---|---|
| EP | 0 875 887 | 11/1998 |
| EP | 1 014 366 | 6/2000 |

* cited by examiner

*Primary Examiner*—Thang V. Tran
*Assistant Examiner*—Bach Vuong
(74) *Attorney, Agent, or Firm*—Staas & Halsey LLP

(57) ABSTRACT

A disturbance compensation module using learning control generates a control input to compensate for track position errors due to a periodic disturbance occurring in an optical recording medium in an optical recording medium drive servo system of an optical recording/reproducing apparatus. The module includes a first filter to filter the track position errors and a memory to store control inputs to compensate for a track control cycle in a corresponding address. A second filter filters the control inputs stored in the memory. An adder adds the filtered track position errors from the first filter to the filtered control inputs from the second filter and outputs a result to the memory, updating the control inputs to compensate for the track position errors.

29 Claims, 7 Drawing Sheets

APPARATUS AND METHOD TO COMPENSATE FOR DISTURBANCE USING LEARNING CONTROL IN AN OPTICAL RECORDING/REPRODUCING APPARATUS AND OPTICAL RECORDING MEDIUM DRIVE SERVO SYSTEM

CROSS-REFERENCE TO RELATED APPLICATIONS

This application claims the benefit of Korean Application No. 2001-49866, filed Aug. 26, 2000, in the Korean Industrial Property Office, the disclosure of which is incorporated herein by reference.

BACKGROUND OF THE INVENTION

1. Field of the Invention

The present invention relates to compensating for disturbances in an optical recording/reproducing apparatus using learning control, and more particularly, to an apparatus and method for compensating for disturbances, such as eccentricity in a disk drive system of the optical recording/reproducing apparatus by performing feed-forward control using an iterative learning method, storing a result of the feed-forward control, and applying the result of the feed-forward control to a compensator to compensate for disturbances.

2. Description of the Related Art

FIG. 1 shows an example of a tracking error signal generated due to eccentricity in an optical recording medium. Eccentricity occurring in the optical recording medium is due to a rotation shaft of a spindle inconsistently rotating a disk at a center of a track of the disk. In an optical recording medium drive system, the eccentricity of the optical recording medium has served as an important periodic disturbance factor, and its influence increases with an increase in speed multiple. Accurately following the track of the disk cannot be accomplished without compensating for the eccentricity. Accordingly, conventional systems have utilized various eccentricity compensation methods.

FIG. 2 is a block diagram of a pickup head (PUH) position control system in a typical optical recording/reproducing apparatus. The PUH position control system receives a position command directing a pickup head (not shown) to be positioned at a desired location. A signal representing an actual position of an actuator 220 of an optical recording medium drive for moving the pickup head is fed back in a negative direction and added to a position command signal in an adder 200. An error signal e output from the adder 200 is applied to a controller 210. The controller 210 performs a predetermined algorithm for compensating for the error signal e, and outputs a compensated signal to the actuator 220. The actuator 220 moves the pickup head in response to the compensated signal received from the controller 210. These operations are repeated, and thus the position of the pickup head is adjusted. However, this control system cannot deal with a disturbance, such as a large eccentricity.

FIG. 3 is a block diagram of an embodiment of a conventional PUH position control system in which a routine for performing disturbance compensation is added to the control system of FIG. 2. In this system, a compensation routine 300 is performed on the assumption that a perfect sine wave $A\sin(\omega t+\psi)$ is an eccentricity signal, having an eccentricity of A, a disk rotation frequency $\omega$, and an eccentricity phase $\psi$. This compensation method is disclosed in U.S. Pat. No. 5,892,742, which is hereby incorporated by reference. In the operation of the system of FIG. 3, a feed-forward control input is calculated from an error waveform, as shown in FIG. 1, before control of tracking starts. That is, the size of the eccentricity is determined by a number of track errors generated during one rotation of a spindle over a track (i.e., during a cycle) shown in FIG. 1, and a phase of eccentricity is determined by a spindle index reference signal representing one rotation and a delay time at which the period of the track error is greatest. The thus-calculated feed-forward control input is added to the output of the controller 210 of FIG. 3 to accomplish a track error compensation including compensation of eccentricity. This disturbance compensation method is very simply performed and so it can be easily applied. However, this disturbance compensation method is an open-loop control method, which does not consider the response characteristics of an existing servo (actuator) control system. There is a limit in the performance of the disturbance compensation method since periodic disturbances including eccentricity are not perfect sine waves.

FIG. 4 is a block diagram of another embodiment of a conventional PUH position control system in which a routine for performing disturbance compensation is added to the control system of FIG. 2. The system of FIG. 4 is disclosed in U.S. Pat. No. 5,550,685, which is hereby incorporated by reference, and is applied to hard disk drive systems. In this control system, first, a fixed feed-forward control input is obtained using a track error signal and stored in a table 400 prior to starting control. Then, upon control, errors generated due to disturbances are compensated using the stored control input. This control system also includes a separate adaptive feed-forward control unit 410 in preparation for changes in characteristics of repeatable run out (RRO) caused by external factors during operation of a drive system. A discrete Fourier transform (DFT) and an inverse discrete Fourier transform (IDFT) are sequentially performed to extract a specific frequency component from a position error signal PES, thereby obtaining a signal with a specific frequency component. The obtained specific frequency component signal is added to the error input of an existing servo control loop. In this way, error compensation control can be accomplished.

The system of FIG. 4 is complicated since it accomplishes error compensation control in consideration of the entire closed-loop response characteristics, but can be considered a more effective disturbance compensation system than FIG. 3. However, the system of FIG. 4 considers only disturbances of a specific frequency component rather than disturbances with all frequency components actually present in a control region of the disk drive system, and it is difficult to cope with changes in a cycle such as variations in the speed multiple.

Therefore, in a periodic system such as the disk drive system, calculations of a control input in consideration with all frequency components within a control region is necessary for a high-performance disturbance compensation operation. Also, new disturbance compensation methods and apparatuses are required to effectively cope with changes in system cycle caused by a variation of the speed multiple and a variation of a control mode.

SUMMARY OF THE INVENTION

Various objects and advantages of the invention will be set forth in part in the description that follows and, in part, will be obvious from the description, or may be learned by practice of the invention.

To solve the above problem, an objective of the present invention is to provide an apparatus and method of compensating for disk disturbances having periodic disturbances with all frequency components within the control region of an optical recording medium drive servo system and considering variations in the rotation speed multiple of the optical recording medium in an optical recording/reproducing apparatus.

To achieve the above and other objectives, the present invention provides an optical recording medium drive servo system of an optical recording/reproducing apparatus having a head, the system including an actuator moving a position of the head for recording data on a recording medium or reproducing the recorded data from the recording medium; an error detector detecting a position error including a difference between a reference position on the recording medium and an actual position of the head; a compensator receiving the position error from the error detector and producing a value therefrom to drive the actuator; a first memory storing control inputs for compensating for the position error of the actuator due to a disturbance; a second memory converting the control inputs of the first memory according to a phase and storing converted control inputs; a timing controller generating addresses for the first memory and the second memory according to the phase; and an adder adding the control inputs of the first memory or the converted control inputs of the second memory to the driving value from the compensator and providing a resulting sum to the actuator to compensate for the disturbance.

The first memory stores the control inputs to compensate for the position error generated during a predetermined rotation period of time through repeated operations of updating the control inputs stored in the first memory unit with a sum of a position error filtered value and a filtered value of the control inputs stored in the first memory unit, the operations being repeated until the position error is at or below a predetermined value.

A first filter filtering the position error value; and a second filter filtering the control inputs stored in the first memory, wherein a filtering coefficient is determined for the first and second filters, so that the sum is converged as a number of repetitions of the operations increases.

The timing controller generates an address for the first memory corresponding to a number of samples of position errors generated during one rotation cycle using a frequency generator pulse (FG) of a spindle motor for rotating the recording medium for the first memory and generates an address for the second memory corresponding to a number of rising edges and falling edges of the FG generated during the one rotation cycle.

The optical recording medium drive servo system may further include an interpolator interpolating the control inputs stored in the addresses of the second memory before the control inputs of the second memory is applied to the adder.

The optical recording medium drive servo system may further include a multiplexer outputting the control inputs of the first memory to the adder during a process in which the control inputs are stored in the first memory until position errors are converged to a predetermined value, and outputting interpolated control inputs from the interpolator after the process.

To achieve the above and other objectives, the present invention also provides a disturbance compensation module using learning control, for generating a control input to compensate for track position errors due to a periodic disturbance occurring in an optical recording medium in an optical recording medium drive servo system of an optical recording/reproducing apparatus, the module including: a first filter filtering the track position errors; a memory storing control inputs for compensating for a track control cycle in a corresponding address, wherein the memory includes addresses, a number of which corresponds to a number of samples of the track position errors; a second filter filtering the control inputs stored in the memory; and an adder adding the filtered track position errors from the first filter to the filtered control inputs from the second filter and outputting a result of the addition to the memory, updating the control inputs to compensate for the track control cycle. The control inputs previously stored in the memory are updated with the result from the adder until the track position error is at or below a predetermined value.

The disturbance compensation may further include a a second memory storing final control inputs for compensating for the track control cycle in response to a pulse edge timing generated during a one track control cycle; and an interpolator interpolating the final control inputs stored in the second memory, wherein a track position control is made using the interpolated final control inputs to control the tracks on the optical recording medium.

To achieve the above and other objectives, the present invention also provides a disturbance compensation module using learning control, for generating a control input to compensate for track position errors due to a periodic disturbance occurring in an optical recording medium in an optical recording medium drive servo system of an optical recording/reproducing apparatus, the module including: a first filter filtering the track position errors; a first memory comprising addresses, the number of which corresponds to a number of samples of the track position errors, and storing control inputs for compensating for a track control cycle in the addresses; a second filter filtering the control inputs stored in the memory; an adder adding the filtered track position errors from the first filter to the filtered control inputs from the second filter and outputting a result of the addition to the first memory; a second memory storing final control inputs for compensating for the track position errors in response to a pulse edge timing generated during a one track control cycle; and an interpolator interpolating the final control inputs stored in the second memory, wherein the control inputs previously stored in the first memory are updated with the result from the adder until the track position error is at or below a predetermined value, and a track position control is made using the interpolated final control inputs to control tracks on the optical recording medium.

The disturbance compensation module may further include a multiplexer multiplexing the control inputs stored in the first memory to obtain an error-compensation control input value for a track position control during the one track control cycle and the interpolated final control inputs from the interpolator after all control inputs for disturbance compensation during the track control cycle are obtained and stored in the first memory.

To achieve the above and other objectives, the present invention also provides a disturbance compensation method using learning control generating a control input for compensating for track position errors due to a periodic disturbance occurring on an optical recording medium, the method including: determining whether a control input for disturbance compensation is required; obtaining a feedforward control input to compensate for a track control cycle on the optical recording medium determined when the control input is determined to be required; converting the feed-forward control input into the control input depending on a phase of a track driving spindle and storing the converted control input value; and compensating for the track position errors generated due to the disturbance using the converted control input.

The method further including determining that a disturbance compensation control input is required when a magnitude of the track position error is equal to or greater than a predetermined value, wherein the track position errors on the optical recording medium is measured prior to controlling tracking in the optical recording medium are measured equal to or greater than a predetermined value, it is determined that a disturbance compensation control input is required].

A control process is one rotation of a track on the optical recording medium and when a k-th attempted control input result is $u_k(t)$ and the track position error measured is $e_k(t)$, a (k+1)th attempted control input result $u_{k+1}(t)$ is calculated using a following equation:

$$U_{k+1}(s) = P(s)U_k(s) + Q(s)E_k(s)$$

wherein $U_{k+1}(s)$, $U_k(s)$ and $E_k(s)$ denote Laplace transforms of $u_{k+1}(t)$, $u_k(t)$ and $e_k(t)$, respectively, and P(s) and Q(s) denote functions representative of a predetermined filter characteristic determined so that $U_{k+1}(s)$ is converged, and a final periodic feed-forward control input is obtained by repetitive operations of the equation.

The feed-forward control input is adapted to compensate for the track position errors, until the final feed-forward control input is obtained, and the control input converted according to the phase is adapted to compensate for the track position error after the final feed-forward control input generated during the track control cycle is obtained.

The method further includes interpolating the stored values and outputting the interpolated values to a disturbance compensation control input.

The present invention also provides for a method for an optical recording medium drive servo system of an optical recording/reproducing apparatus having a head, the method including: moving a position of the head for recording data on a recording medium or reproducing the recorded data from the recording medium; detecting a position error including a difference between a reference position on the recording medium and an actual position of the head; receiving the position error and producing a value therefrom to drive a disk drive system; storing control inputs to compensate for the position error due to a disturbance; converting the control inputs stored according to a phase and storing converted control inputs; generating addresses for the control inputs stored and the converted control inputs according to the phase; and adding the control inputs stored or the converted control inputs to the value to drive the disk drive and providing a resulting sum to the disk drive system to compensate for the disturbance.

The present invention also provides for a method for generating a control input to compensate for track position errors due to a periodic disturbance occurring in an optical recording medium in an optical recording medium drive servo system of an optical recording/reproducing apparatus, the method including: filtering the track position errors; storing control inputs for compensating for a track control cycle in a corresponding address and storing addresses, a number of which corresponds to a number of samples of the track position errors; filtering the control inputs stored; adding the filtered track position errors to the filtered control inputs; and outputting a result of the addition to update the control inputs to compensate for the track control cycle.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENT

Reference will now made in detail to the present preferred embodiments of the present invention, examples of which are illustrated in the accompanying drawings. The embodiments are described below in order to explain the present invention by referring to the figures.

Figure 5:
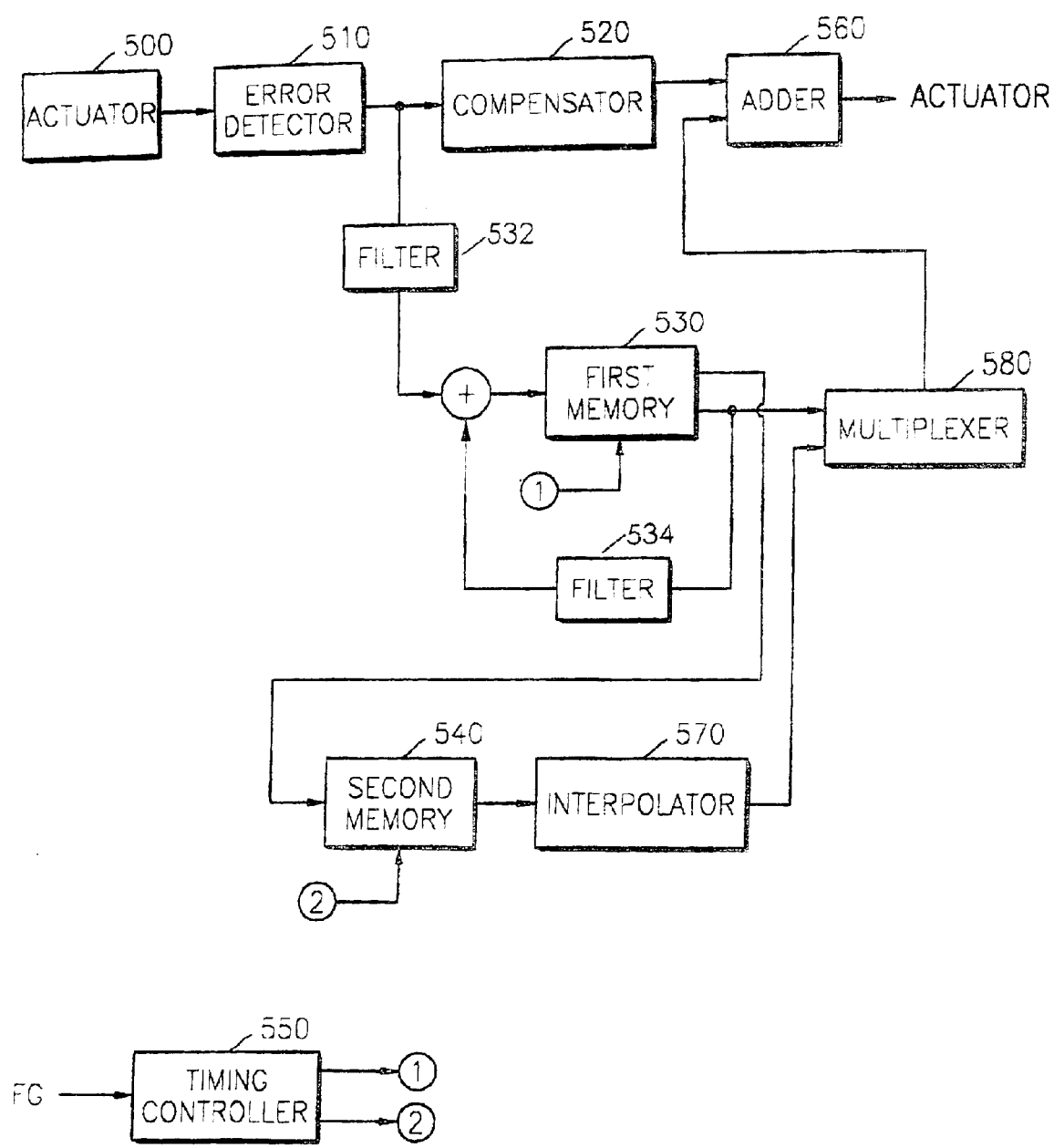
FIG. 5 is a block diagram of an optical recording medium drive servo system in an optical recording/reproducing apparatus according to the present invention.

Referring to FIG. 5, an optical recording medium drive servo system of an optical recording/reproducing apparatus according to the present invention includes an actuator 500, an error detector 510, a compensator 520, a first memory 530, a second memory 540, and an adder 560.

The actuator 500 moves a position of a head (for example, a pickup head) for recording data on an optical recording medium or reproducing data therefrom. The error detector 510 detects a difference (i.e., a track position error) between a reference position on the recording medium and an actual position of the head. The compensator 520 receives the position error output value from the error detector 510 and produces a driving value to the actuator by applying a predetermined algorithm to reduce the position error. The first memory 530 stores a control input to compensate for the position error for one period made by the actuator 500 due to a periodic disturbance, such as an eccentricity on the optical recording medium. Further, the first memory 530 stores control inputs to compensate for the position error generated for a predetermined rotation period of time through repeated operations of updating the control input previously stored in the first memory unit 530 with a sum of the position error filtered value by a first filter 532 and the the control input filtered by a second filter 534 previously stored in the first memory unit 530, the operations being repeated until the position error is at or below a predetermined value. The updating operation may be included in an algorithm for compensating for disturbance, and any well-known algorithm may be executed to perform such operation.

Determination of the most appropriate control input through the above-described repetitive summing of a previously generated control input and a resultant error compensation result (which is indicated as the position error) can be referred to as a learning control. As a number of repetitive summing increases to a predetermined number, a filtering coefficient must be determined for each of the first and second filters 532, 534 so that the sums are converged. The coefficient of the first filter 532 may be different or same to the coefficient determined for the second filter 534. The coefficients are determined in advance so that a value resulting from adding each output from the first and second filters 532, 534 converges as the adding operation is repeated. The second memory 540 converts the control input stored in the first memory 530 to a phase and stores the converted control input after the learning control is completely performed, in order to uniformly use the control input value in the first memory 530, regardless of a number of rotations of a spindle and depending on a variation in the reproduction speed multiple of the recording medium. A timing controller 550 generates addresses of the first and second memories 530 and 540 according to the phase. That is, the timing controller 550 generates an address corresponding to a number of samples of the position errors generated during one rotation cycle, using a frequency generator pulse (FG) of a spindle motor for rotating the recording medium, and outputs the generated address to the first memory 530. The timing controller 550 also generates an address corresponding to a number of rising edges and falling edges of the FG generated during one rotation cycle and outputs the generated address to the second memory 540. The adder 560 adds the control input of the first memory 530 or the converted control input of the second memory 540 to the driving value from the compensator 520 and provides a resulting sum to the actuator 500, thereby compensating for periodic disturbances.

The optical recording medium drive servo system can further include an interpolator 570 interpolating the compensation control inputs stored in neighboring addresses of the second memory 540 before the control input value of the second memory 540 is applied to the adder 560. The optical recording medium drive servo system can further include a multiplexer 580 outputting the control input value of the first memory 530 to the adder 560, during a learning control process, in which the control input values are stored in the first memory 530, and outputting the interpolated compensation control inputs from the interpolator 570 after the learning control process is completed.

Figure 1:
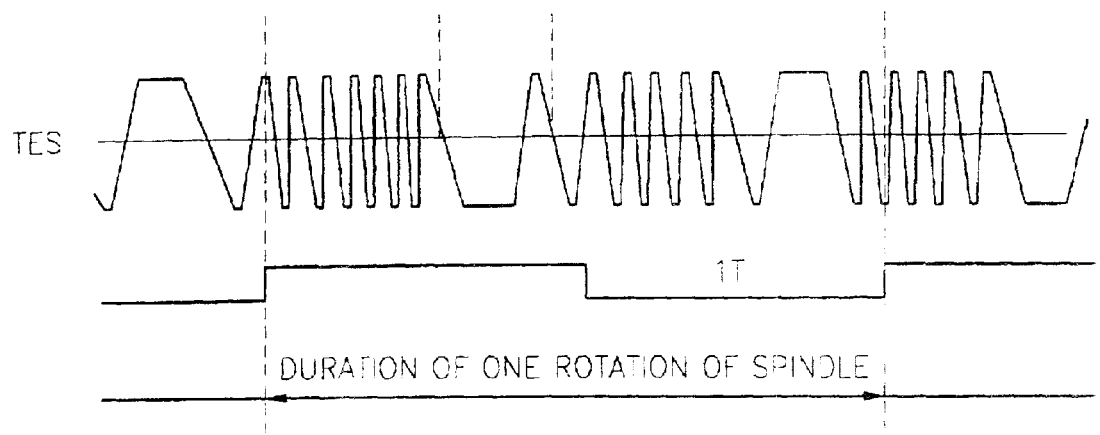
FIG. 1 illustrates an example of a tracking error signal generated due to eccentricity of an optical recording medium drive servo system.
Figure 2:
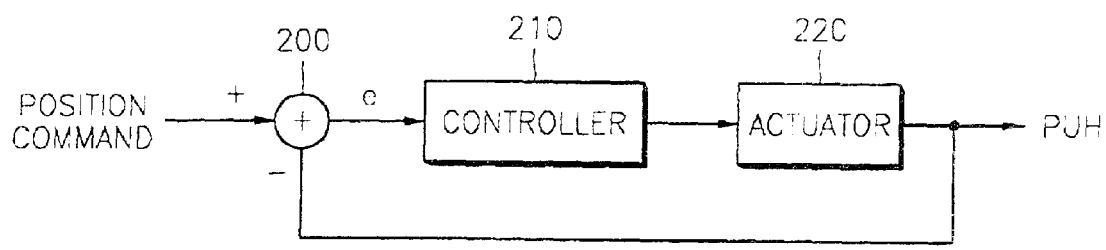
FIG. 2 is a block diagram of a pickup head position control system of a typical optical recording/reproducing apparatus.
Figure 3:
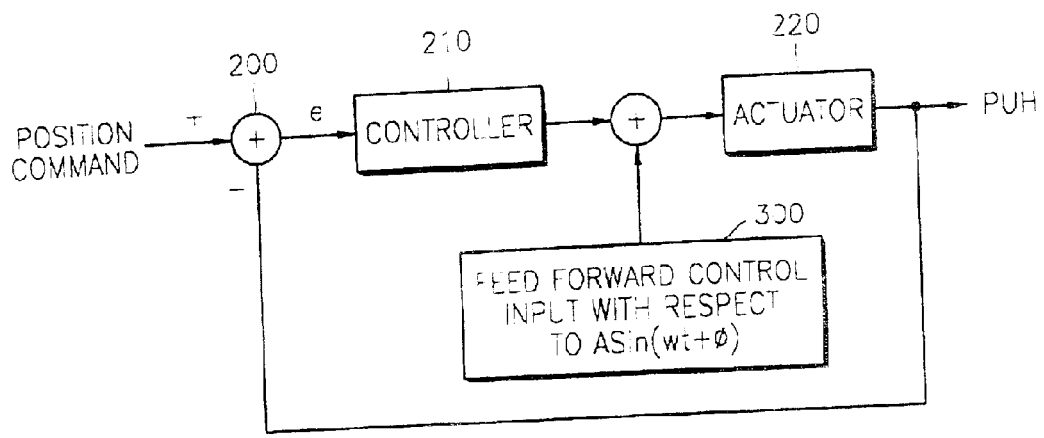
FIG. 3 is a block diagram of an embodiment of a conventional pickup head position control system obtained by adding a disturbance compensating routine to the control system of FIG. 2.
Figure 4:
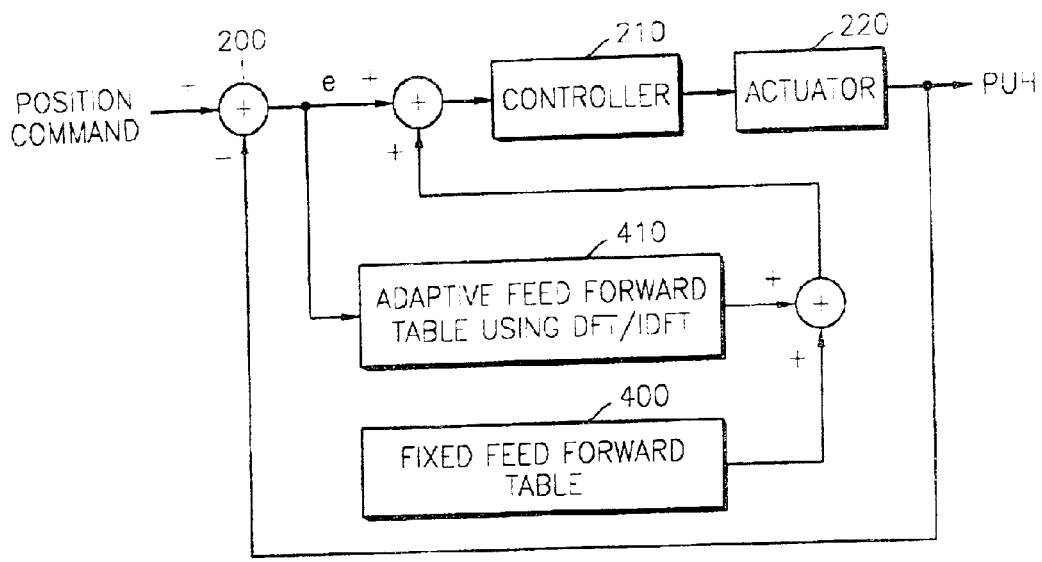
FIG. 4 is a block diagram of another embodiment of a conventional pickup head position control system obtained by adding a disturbance compensating routine to the control system of FIG. 2.
Figure 6:
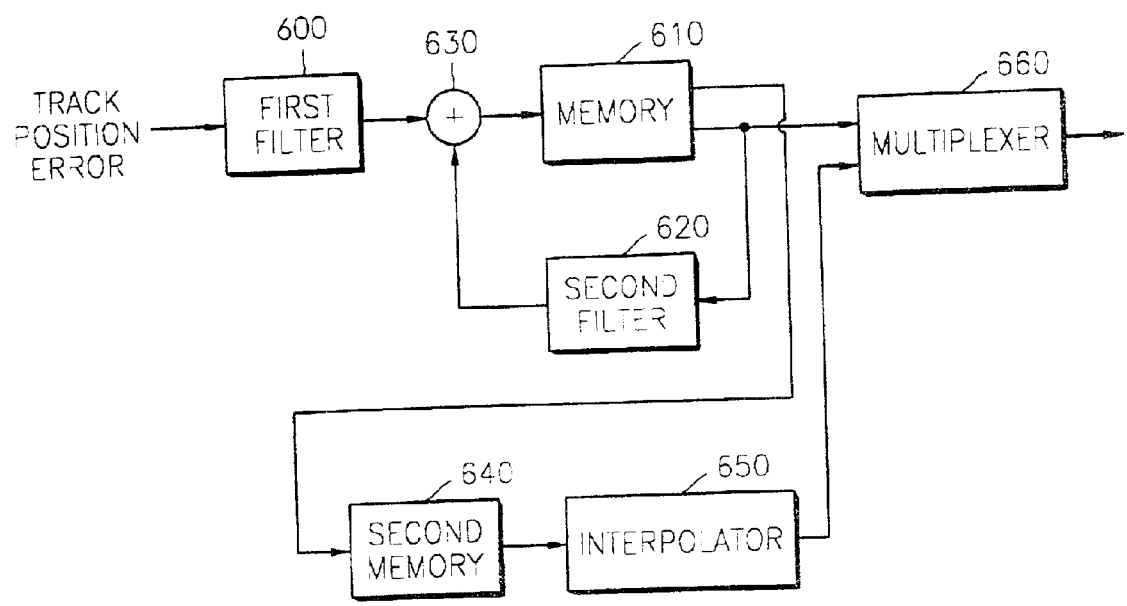
FIG. 6 is a block diagram of a disturbance compensation module using learning control according to the present invention.

FIG. 6 is a block diagram of a disturbance compensation module using learning control according to the present invention. In this disturbance compensation module using learning control, the control input to compensate for a track control cycle due to periodic disturbance, such as eccentricity occurring on the optical recording medium, is added to the output of the existing position error compensation controller 210 (see FIG. 2) in the optical recording medium drive servo system of the optical recording/reproducing apparatus.

This disturbance compensation module using learning control, includes a first filter 600, a memory 610, a second filter 620, and an adder 630. The first filter 600 receives and filters the track position error. The memory 610 has addresses, a number of which corresponds to a number of samples of track position errors, and stores a control input value for compensating for the track control cycle in a corresponding address. Until the track position error input to the first filter 600 is at or below a predetermined value, the memory 610 repeats operations of updating the control input value previously stored in the memory 610 with a sum from the adder 630 of a value obtained by filtering the track position error by the first filter 600 and a value obtained by filtering the control input value stored in the memory 610 by the second filter 620. Thus, the memory 610 stores the control input compensating for position errors generated during a predetermined rotation period of time. The most appropriate control input is determined by taking the values of the above-described repetitive summing of the previously-generated control input and the resultant error compensation result (which is indicated as a position error), which can be referred to as the learning control. As a number of repetitive summing increases, filtering coefficients of the first and second filters 600 and 620 are determined so that the sums are converged.

The disturbance compensation module of FIG. 6 can further include a second memory 640 and an interpolator 650 to output the control input value for disturbance compensation against the change in the speed of the optical recording medium. When final control input values compensating for the track control cycle generated are stored in the memory 610, the second memory 640 stores the final control input values in response to a pulse edge timing generated during a one track control cycle. The interpolator 650 interpolates the stored control inputs in the second memory 640 to restore the control input values between the pulse edges not stored in the second memory 640.

The disturbance compensation module of FIG. 6 can further include a multiplexer 660 multiplexing a control input value of the memory 610 in the middle of the learning control process in which control input values are stored in the memory 610 and the interpolated control input values from the interpolator 650 after the learning control process is completed.

Figure 7A:
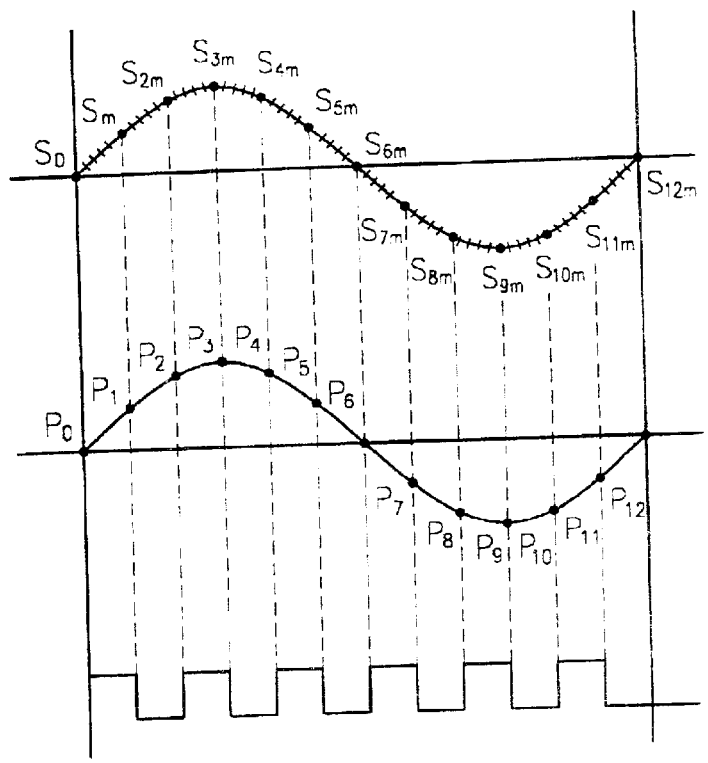
FIG. 7A illustrates sample points with respect to a periodic control input waveform during a one track control cycle in the block diagram of FIG. 6 and points corresponding to pulse edges representative of phases of a spindle, which rotates over a track in the block diagram of FIG. 6.

FIG. 7A illustrates sample points ($s_0$ through $s_{12m}$) on a waveform of a periodic control input during the one track control cycle in the module of FIG. 6 and points ($P_0$ through $P_{12}$) corresponding to FG pulse edges representative of phases of the spindle, which rotates over a track. There are 0 to m sample points within a pulse edge.

Figure 7B:
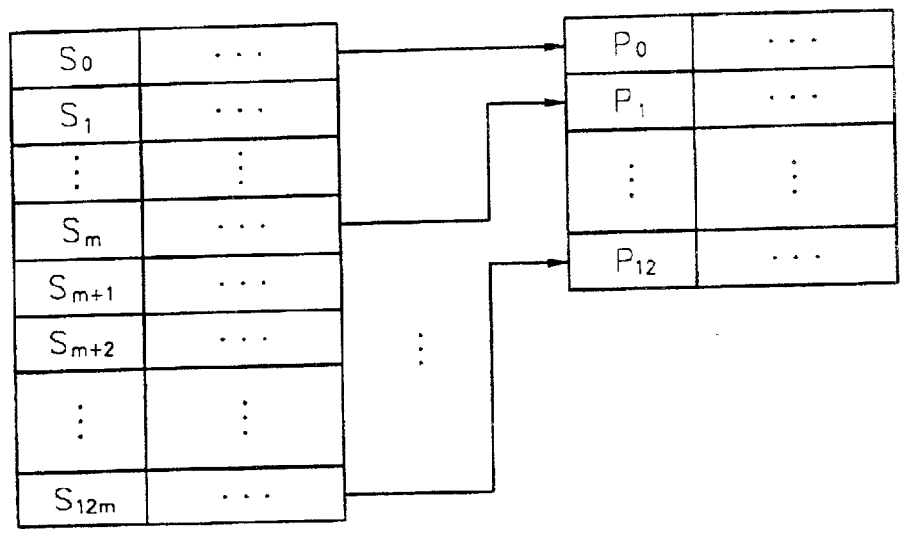
FIG. 7B shows an example of a control input table, which is stored in first and second memory units of FIGS. 5 and 6, respectively, corresponding to the points of FIG. 7A.

FIG. 7B shows an example of control input tables, which are in the first and second memory units 530 and 540 of FIG. 5 in synchronization with the sample points of FIG. 7A.

Figure 8:
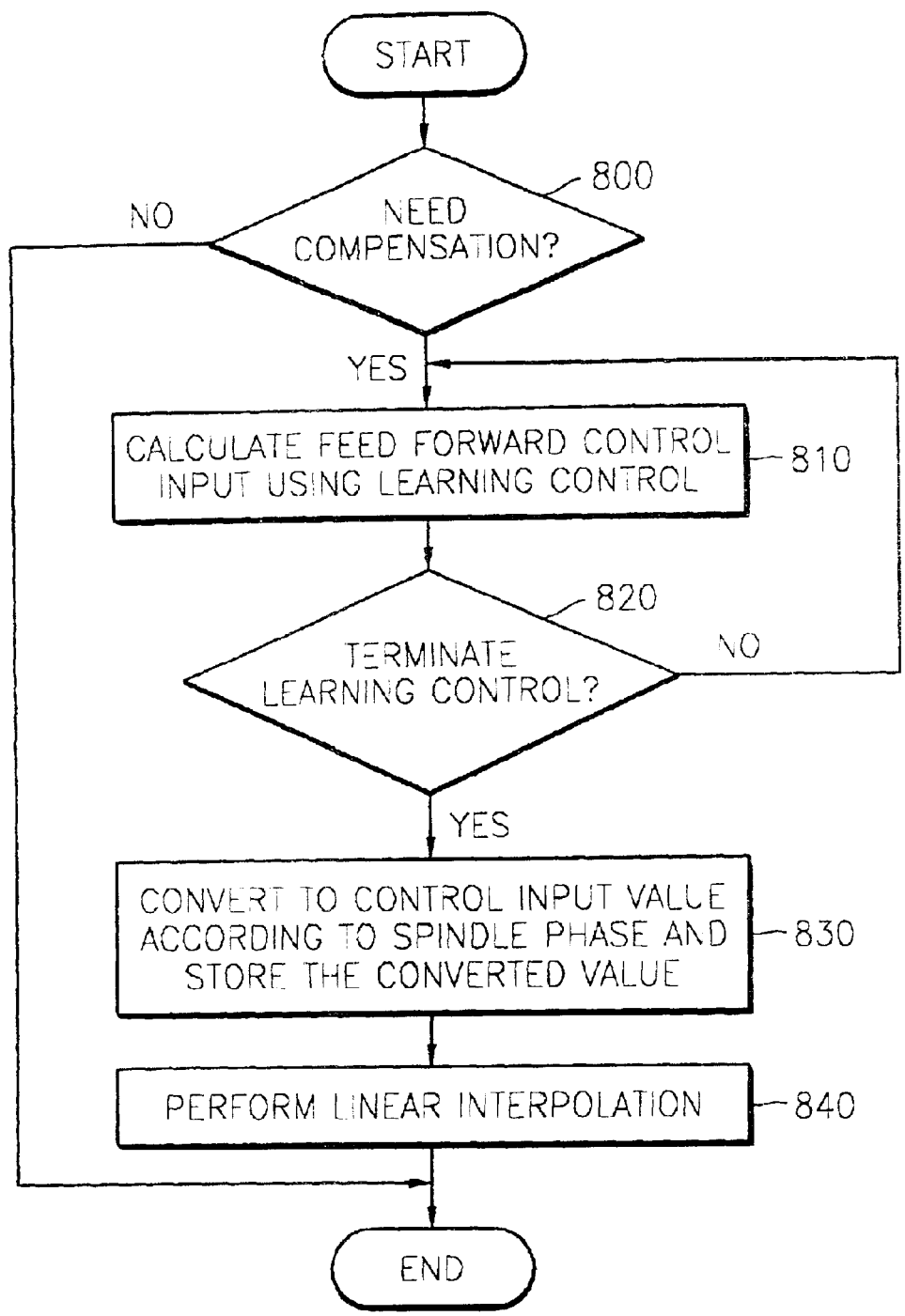
FIG. 8 is a flowchart illustrating a disturbance compensation method using learning control, according to the present invention.

FIG. 8 is a flowchart illustrating a disturbance compensation method using learning control, according to the present invention. In the disturbance compensation method using learning control in which the learning-use optical recording/reproducing apparatus generates a control input to compensate for a track control cycle due to a periodic disturbance, such as eccentricity occurring on the optical recording medium, at operation 800, the method determines whether a disturbance compensation control input is required. The magnitude on the periodic disturbance such as the eccentricity of the disk is measured prior to starting control of tracking in the optical recording medium drive servo system. If the magnitude of the track position error is equal to or greater than a predetermined value, the method determines that a disturbance compensation control input is required. If the optical recording medium is an optical disk, the disk drive system performs focusing, and the amount of eccentricity of the disk is measured prior to tracking. If the amount of eccentricity is smaller than a predetermined reference, the magnitude of disturbance actually occurring in a control system is small enough to be sufficiently compensated for with an existing controller alone, so that a learning control is not required.

On the other hand, if the amount of eccentricity is equal to or greater than the predetermined reference, disturbance compensation just by the existing controller alone is not possible, so that the feed-forward control input must be calculated using a learning control algorithm. At operation 810, if the method determines that the control input is required for disturbance compensation, a feed-forward control input to compensate for the track position errors during one cycle is calculated. Assuming that one rotation of the track is referred to as a control process, when a k-th attempted control input result is $u_k(t)$ and the track position error measured in this case is $e_k(t)$, a (k+1)th attempted control input result $u_{k+1}(t)$ is calculated as shown in Equation 1.

$$U_{k+1}(s)=P(s)U_k(s)+Q(s)E_k(s) \quad (1)$$

wherein $U_{k+1}(s)$, $U_k(s)$ and $E_k(s)$ denote Laplace transforms of $u_{k+1}(t)$, $u_k(t)$ and $e_k(t)$, respectively, and P(s) and Q(s) denote functions representative of a predetermined filter characteristic determined so that $U_{k+1}(s)$ is converged, and a final periodic feed-forward control input is obtained by repetitive operations of Equation 1.

A final periodic feed-forward control input is obtained by repeating Equation 1 and stored in the first memory 530 of FIG. 5 and the memory 610 of FIG. 6. In the calculation of the feed-forward control input, a compensation control input value is obtained by a repetitive learning of the position error. Once learning control operation 820 is completed, the calculated feed-forward control input is converted into the control input value depending on a phase of the spindle and stored. This conversion is a conversion of control input values based on a cycle of track rotation time into spatial control input values based on a phase of rotation of the track. In an actual disk drive system, the rotation speed of the spindle, which determines the rotation of the disk, may vary according to a constant linear velocity (CLV) control or a variation in a speed multiple of reproduction of the disk. This disk drive system cannot directly use the control input values calculated in operation 820, so the control inputs must be obtained depending on a variation in the speed multiple through a new learning process.

Figure 9:
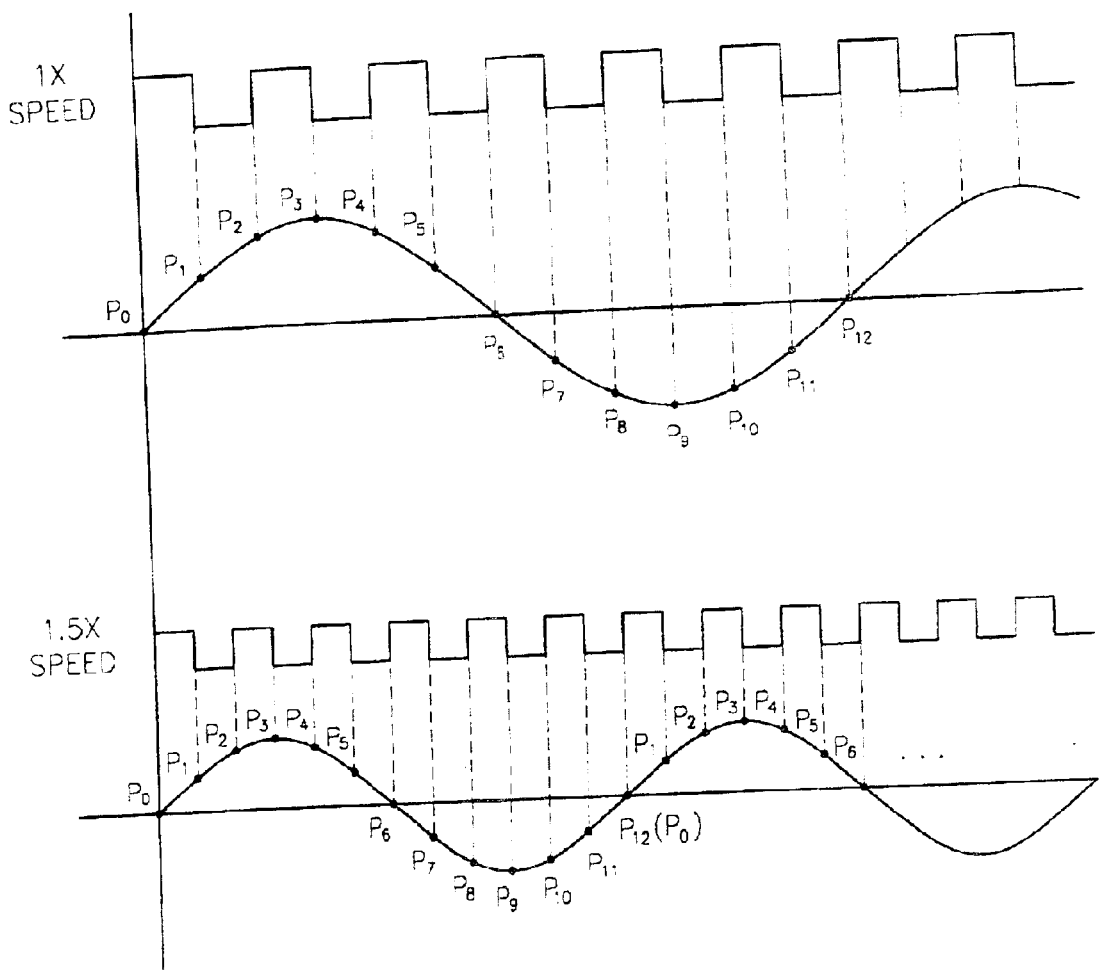
FIG. 9 shows an example of a change in speed of the optical recording medium and a change in a waveform of an error compensation control input corresponding to the change in the speed of the optical recording medium.

Thus, at operation 830, the calculated feed-forward control input is converted into the control input value depending on the phase of the spindle, in order to effectively compensate for the eccentricity due to the speed multiple variation in the reproduction of the disk, that is, a periodic disturbance, without performing a new learning process, and the converted control input value is used in the case of the variation in the speed multiple of reproduction of the disk. FIG. 9 shows an example of error compensation control input values depending on the variation in the speed multiple of the optical recording medium using the result obtained in operation 830. When there is a variation in the speed multiple of the disk, the rotation phase is constant, but a rotation frequency varies, so that the result obtained in operation 830 can be applied without change in accordance with the variation in frequency. At operation 840, because the control input value is produced at a time when an edge of the frequency generator (FG) pulse occurs, the control input value between edges is restored by linear interpolation. Therefore, continuous control input values may be output.

According to the present invention, a periodic disturbance component including the eccentricity can be rapidly and effectively compensated for using a previously-learned control result regardless of the variation in cycle, such as a variation in the speed of a spindle due to a variation in a reproduction speed of a recording medium.

While the invention has been described with reference to the exemplary embodiments thereof, those skilled in the art will be able to make various modifications to the described embodiments of the invention without departing from the true spirit and scope of the invention.

What is claimed is:

1. An optical recording medium drive servo system of an optical recording/reproducing apparatus having a head, the system comprising:

an actuator moving a position of the head for recording data on a recording medium or reproducing the recorded data from the recording medium;

an error detector detecting a position error comprising a difference between a reference position on the recording medium and an actual position of the head;

a compensator receiving the position error from the error detector and producing a value therefrom to drive the actuator;

a first memory storing control inputs for compensating for the position error of the actuator due to a disturbance;

a second memory converting the control inputs of the first memory according to a phase and storing converted control inputs;

a timing controller generating addresses for the first memory and the second memory according to the phase; and an adder adding the control inputs of the first memory or the converted control inputs of the second memory to the driving value from the compensator and providing a resulting sum to the actuator to compensate for the disturbance.

2. The optical recording medium drive servo system as recited in claim 1, wherein the first memory stores the control inputs to compensate for the position error generated during a predetermined rotation period of time through repeated operations of updating the control inputs stored in the first memory unit with a sum of a position error filtered value and a filtered value of the control inputs stored in the first memory unit, the operations being repeated until the position error is at or below a predetermined value.

3. The optical recording medium drive servo system as recited in claim 2, further comprising:

a first filter filtering the position error value; and a second filter filtering the control inputs stored in the first memory, wherein a filtering coefficient is determined for the first and second filters, so that the sum is converged as a number of repetitions of the operations increases.

4. The optical recording medium drive servo system as recited in claim 1, wherein the timing controller generates an address for the first memory corresponding to a number of samples of position errors generated during one rotation cycle using a frequency generator pulse (FG) of a spindle motor for rotating the recording medium for the first memory and generates an address for the second memory corresponding to a number of rising edges and falling edges of the FG generated during the one rotation cycle.

5. The optical recording medium drive servo system as recited in claim 1, further comprising an interpolator interpolating the control inputs stored in the addresses of the second memory before the control inputs of the second memory is applied to the adder.

6. The optical recording medium drive servo system as recited in claim 5, further comprising a multiplexer outputting the control inputs of the first memory to the adder during a process in which the control inputs are stored in the first memory until position errors are converged to a predetermined value, and outputting interpolated control inputs from the interpolator after the process.

7. The optical recording medium drive servo system as recited in claim 1, wherein the disturbance is eccentricity.

8. A disturbance compensation module using learning control, for generating a control input to compensate for track position errors due to a periodic disturbance occurring in an optical recording medium in an optical recording medium drive servo system of an optical recording/reproducing apparatus, the module comprising:

a first filter filtering the track position errors;

a memory storing control inputs for compensating for a track control cycle in a corresponding address, wherein the memory comprises addresses, a number of which corresponds to a number of samples of the track position errors;

a second filter filtering the control inputs stored in the memory; and an adder adding the filtered track position errors from the first filter to the filtered control inputs from the second filter and outputting a result of the addition to the memory, updating the control inputs to compensate for the track control cycle.

9. The disturbance compensation module as recited in claim 8, wherein the control inputs previously stored in the memory are updated with the result from the adder until the track position error is at or below a predetermined value.

10. The disturbance compensation module as recited in claim 8, further comprising:

a second memory storing final control inputs for compensating for the track control cycle in response to a pulse edge timing generated during a one track control cycle; and an interpolator interpolating the final control inputs stored in the second memory, wherein a track position control is made using the interpolated final control inputs to control the tracks on the optical recording medium.

11. The disturbance compensation module as recited in claim 8, wherein filter coefficients for the first and second filters are determined so that the track position errors and the control inputs are converged as a frequency of learning increases.

12. The disturbance compensation module as recited in claim 10, further comprising:

a multiplexer multiplexing the control inputs stored in the memory and the interpolated final control inputs for a track position control on the optical recording medium after the learning control is complete.

13. The disturbance compensation module as recited in claim 8, wherein the disturbance is eccentricity.

14. A disturbance compensation module using learning control, for generating a control input to compensate for track position errors due to a periodic disturbance occurring in an optical recording medium in an optical recording medium drive servo system of an optical recording/reproducing apparatus, the module comprising:

a first filter filtering the track position errors;

a first memory comprising addresses, the number of which corresponds to a number of samples of the track position errors, and storing control inputs for compensating for a track control cycle in the addresses;

a second filter filtering the control inputs stored in the memory;

an adder adding the filtered track position errors from the first filter to the filtered control inputs from the second filter and outputting a result of the addition to the first memory;

a second memory storing final control inputs for compensating for the track position errors in response to a pulse edge timing generated during a one track control cycle; and an interpolator interpolating the final control inputs stored in the second memory, wherein the control inputs previously stored in the first memory are updated with the result from the adder until the track position error is at or below a predetermined value, and a track position control is made using the interpolated final control inputs to control tracks on the optical recording medium.

15. The disturbance compensation module as recited in claim 14, wherein filter coefficients of the first and second filters are determined so that the track position errors and control inputs are converged as a frequency of learning increases.

16. The disturbance compensation module as recited in claim 14, further comprising a multiplexer multiplexing the control inputs stored in the first memory to obtain an error-compensation control input value during the one track control cycle and the interpolated final control inputs from the interpolator after all control inputs for disturbance compensation during the track control cycle are obtained and stored in the first memory.

17. A disturbance compensation method using learning control generating a control input for compensating for track position errors due to a periodic disturbance occurring on an optical recording medium, the method comprising:

determining whether a control input for disturbance compensation is required;

obtaining a feed-forward control input to compensate for a track control cycle on the optical recording medium determined when the control input is determined to be required;

converting the feed-forward control input into the control input depending on a phase of a track driving spindle and storing the converted control input value; and compensating for the track position errors generated due to the disturbance using the converted control input.

18. The disturbance compensation method as recited in claim 17, further comprising:

determining that a disturbance compensation control input is required when a magnitude of the track position error is equal to or greater than a predetermined value, wherein the track position errors on the optical recording medium is measured prior to controlling tracking in the optical recording medium are measured equal to or greater than a predetermined value, it is determined that a disturbance compensation control input is required].

19. The disturbance compensation method as recited in claim 17, wherein a control process is one rotation of a track on the optical recording medium and when a k-th attempted control input result is $u_k(t)$ and the track position error measured is $e_k(t)$, a (k+1)th attempted control input result $u_{k+1}(t)$ is calculated using a following equation:

$$U_{k+1}(s)=P(s)U_k(s)+Q(s)E_k(s)$$

wherein $U_{k+1}(s)$, $U_k(s)$ and $E_k(s)$ denote Laplace transforms of $u_{k+1}(t)$, $u_k(t)$ and $e_k(t)$, respectively, and $P(s)$ and $Q(s)$ denote functions representative of a predetermined filter characteristic determined so that $U_{k+1}(s)$ is converged, and a final periodic feed-forward control input is obtained by repetitive operations of the equation.

20. The disturbance compensation method as recited in claim 19, wherein the feed-forward control input is adapted to compensate for the track position errors, until the final feed-forward control input is obtained, and the control input converted according to the phase is adapted to compensate for the track position error after the final feed-forward control input generated during the track control cycle is obtained.

21. The disturbance compensation method as recited in claim 17, further comprising interpolating the stored values and outputting the interpolated values to a disturbance compensation control input.

22. A method for an optical recording medium drive servo system of an optical recording/reproducing apparatus having a head, the method comprising:

moving a position of the head for recording data on a recording medium or reproducing the recorded data from the recording medium;

detecting a position error comprising a difference between a reference position on the recording medium and an actual position of the head;

receiving the position error and producing a value therefrom to drive a disk drive system;

storing control inputs to compensate for the position error due to a disturbance;

converting the control inputs stored according to a phase and storing converted control inputs;

generating addresses for the control inputs stored and the converted control inputs according to the phase; and adding the control inputs stored or the converted control inputs to the value to drive the disk drive and providing a resulting sum to the disk drive system to compensate for the disturbance.

23. The method as recited in claim 22, further comprising:

storing the control inputs to compensate for the position error generated during a predetermined rotation period of time through repeated operations of updating the control inputs stored with a sum of a position error filtered value and a filtered value of the control inputs stored, the operations being repeated until the position error is at or below a predetermined value.

24. The method as recited in claim 22, further comprising:

generating a first address for the control inputs stored corresponding to a number of samples of position errors generated during one rotation cycle using a frequency generator pulse (FG) of a spindle motor for rotating the recording medium; and generating a second address for the converted control inputs corresponding to a number of rising edges and falling edges of the FG generated during one rotation cycle.

25. The method as recited in claim 22, further comprising:

interpolating the control inputs stored in the first and second addresses before the converted control inputs are added.

26. A method for generating a control input to compensate for track position errors due to a periodic disturbance occurring in an optical recording medium in an optical recording medium drive servo system of an optical recording/reproducing apparatus, the method comprising:

filtering the track position errors;

storing control inputs for compensating for a track control cycle in a corresponding address and storing addresses, a number of which corresponds to a number of samples of the track position errors;

filtering the control inputs stored;

adding the filtered track position errors to the filtered control inputs; and outputting a result of the addition to update the control inputs to compensate for the track control cycle.

27. The method as recited in claim 26, wherein the control inputs previously stored are updated with the result of the addition until the track position error is at or below a predetermined value.

28. The method as recited in claim 26, further comprising:

storing final control inputs for compensating for the track control cycle in response to a pulse edge timing generated during a one track control cycle; and interpolating the final control inputs stored, wherein a track position control is made using the interpolated final control inputs to control tracks on the optical recording medium.

29. The method as recited in claim 28, further comprising:

multiplexing the control inputs stored and the interpolated final control inputs for a track position control on the optical recording medium after the learning control is complete.

* * * * *